(12) United States Patent
Narita

(10) Patent No.: US 9,610,913 B2
(45) Date of Patent: Apr. 4, 2017

(54) VEHICLE BUMPER STRUCTURE INCLUDING A PRESSURE TUBE-TYPE PEDESTRIAN COLLISION DETECTION SENSOR

(71) Applicant: TOYOTA JIDOSHA KABUSHIKI KAISHA, Toyota-shi, Aichi-ken (JP)

(72) Inventor: Sotaro Narita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/812,613

(22) Filed: Jul. 29, 2015

(65) Prior Publication Data

US 2016/0039376 A1 Feb. 11, 2016

(30) Foreign Application Priority Data

Aug. 8, 2014 (JP) ................................. 2014-162445

(51) Int. Cl.
*B60R 19/48* (2006.01)
*B60R 21/0136* (2006.01)
(Continued)

(52) U.S. Cl.
CPC .......... *B60R 19/483* (2013.01); *B60R 21/013* (2013.01); *B60R 21/0136* (2013.01); *B60R 21/34* (2013.01); *B60R 2019/186* (2013.01)

(58) Field of Classification Search
CPC ... B60R 19/483; B60R 19/02; B60R 21/0136; B60R 21/34; B60R 19/26;
(Continued)

(56) References Cited

U.S. PATENT DOCUMENTS

2005/0200139 A1* 9/2005 Suzuki ................ B60R 21/0136
293/117
2007/0114803 A1 5/2007 Takahashi et al.
(Continued)

FOREIGN PATENT DOCUMENTS

JP 2005-186677 A 7/2005
JP 2009-023407 A 2/2009
(Continued)

*Primary Examiner* — Glenn Dayoan
*Assistant Examiner* — Sunsurraye Westbrook
(74) *Attorney, Agent, or Firm* — Oliff PLC

(57) ABSTRACT

In a vehicle bumper structure including a pressure tube-type pedestrian collision detection sensor according to technology disclosed herein, the vehicle bumper structure includes a bumper reinforcement, a pressure tube-type pedestrian collision detection sensor, and an upper absorber. The upper absorber includes an absorber main body, an absorber upper end portion that is integrally provided to the vehicle upper side of the absorber main body, and includes a projecting portion projecting toward the vehicle front-rear direction inner side with respect to the absorber main body at the vehicle upper side of the bumper reinforcement, and a groove portion that is formed at a vehicle front-rear direction inner side portion of the absorber main body, that is disposed adjacent to the vehicle lower side of the absorber upper end portion, that is open toward the vehicle front-rear direction inner side or the vehicle lower side, and that retains a pressure tube.

11 Claims, 6 Drawing Sheets

(51) Int. Cl.
*B60R 21/013* (2006.01)
*B60R 21/34* (2011.01)
*B60R 19/18* (2006.01)

(58) Field of Classification Search
CPC ............... B60R 21/013; B60R 21/0132; B25J 19/0091; B25J 13/081; B25J 19/005; B25J 19/063; B25J 5/007
USPC .............. 293/4, 120, 122, 133, 134, 187.03, 293/187.04, 187.09; 180/274
See application file for complete search history.

(56) References Cited

U.S. PATENT DOCUMENTS

| | | | |
|---|---|---|---|
| 2007/0180891 A1* | 8/2007 | Abe | ................... B60R 21/0136 73/12.09 |
| 2008/0315598 A1* | 12/2008 | Takafuji | ................ B60R 19/483 293/117 |
| 2009/0024323 A1 | 1/2009 | Tanabe | |
| 2009/0027181 A1* | 1/2009 | Tanabe | ................... B60R 19/20 340/436 |
| 2011/0232396 A1* | 9/2011 | Takahashi | ............. B60R 19/483 73/862.581 |

FOREIGN PATENT DOCUMENTS

| | | |
|---|---|---|
| JP | 2010-132040 A | 6/2010 |
| JP | 2014-505629 A | 3/2014 |
| JP | 2015-074389 A | 4/2015 |
| JP | 2015-081070 A | 4/2015 |
| JP | 2015-093579 A | 5/2015 |
| KR | 20060108729 A | 10/2006 |
| WO | 2005/061284 A1 | 7/2005 |
| WO | 2012/113362 A1 | 8/2012 |

\* cited by examiner

VEHICLE BUMPER STRUCTURE INCLUDING A PRESSURE TUBE-TYPE PEDESTRIAN COLLISION DETECTION SENSOR

CROSS-REFERENCE TO RELATED APPLICATION

This application claims priority under 35 USC 119 from Japanese Patent application No. 2014-162445 filed Aug. 8, 2014, the disclosure of which is incorporated by reference herein.

BACKGROUND

Technical Field

Technology disclosed herein relates to a vehicle bumper structure including a pressure tube-type pedestrian collision detection sensor.

Related Art

In a vehicle bumper structure including a pressure tube-type pedestrian collision detection sensor described in International Publication (WO) No. 2012/113362, an absorber is disposed adjacent to a vehicle front side of bumper reinforcement. A groove portion open toward the vehicle rear side is formed to the absorber, and a pressure tube is installed (fitted) inside the groove portion. When the pressure tube deforms during a collision between the vehicle and a colliding body, pressure sensors provided at both length direction end portions of the pressure tube output signals according to a change in pressure in the pressure tube, and an ECU determines whether or not the body colliding with the vehicle is a pedestrian.

However, there is room for improvement in the vehicle bumper structure including the pressure tube-type pedestrian collision detection sensor described above, with regards to increasing detection precision of the pressure tube-type pedestrian collision detection sensor. Namely, an upper side portion and a lower side portion of the groove portion of the absorber (namely, two, these being upper and lower, locations of the absorber) need to be squashed and deformed (undergo compression deformation) in order to deform the pressure tube during a collision between the vehicle and a pedestrian. If the two locations of the absorber are not deformed in a desirable manner during a collision between the vehicle and a pedestrian, the absorber is unable to press the pressure tube in a desirable manner. In such cases, the output from the pressure sensor is reduced, and there is a possibility that the detection precision of the pressure tube-type pedestrian collision detection sensor could be reduced.

SUMMARY

An object of an exemplary embodiment of the present invention is to provide a vehicle bumper structure including a pressure tube-type pedestrian collision detection sensor capable of increasing detection precision.

According to a first embodiment of the present invention, the vehicle bumper structure includes: a bumper reinforcement having a length direction that is disposed along a vehicle width direction at an end section in a vehicle front-rear direction; a pressure tube-type pedestrian collision detection sensor that is configured including a pressure tube that extends along the vehicle width direction at a vehicle front-rear direction outer side of the bumper reinforcement, and that outputs a signal according to a change in pressure of the pressure tube; and an upper absorber that is fixed to the bumper reinforcement, wherein the upper absorber includes: an absorber main body that is disposed at the vehicle front-rear direction outer side of the bumper reinforcement and fixed, either directly or via another member, to a vehicle front-rear direction outer face on an upper portion of the bumper reinforcement, an absorber upper end portion that is integrally provided with a vehicle upper side of the absorber main body, and includes a projecting portion that projects toward a vehicle front-rear direction inner side with respect to the absorber main body at a vehicle upper side of the bumper reinforcement or the other member that fixes the absorber main body, and a groove portion that is formed at a vehicle front-rear direction inner side portion of the absorber main body, that is disposed adjacent to a vehicle lower side of the absorber upper end portion, that is open toward the vehicle front-rear direction inner side or the vehicle lower side, and that retains the pressure tube.

According to the first embodiment of the present invention, the bumper reinforcement having the length direction that is disposed along the vehicle width direction at the end section in the vehicle front-rear direction. The absorber main body of the upper absorber is disposed at the vehicle front-rear direction outer side of the bumper reinforcement (the vehicle front side when the bumper reinforcement is disposed at the front end section of the vehicle, and the vehicle rear side when the bumper reinforcement is disposed at the rear end section of the vehicle), and the absorber main body is fixed, either directly or via the other member, to the vehicle front-rear direction outer face on the upper portion of the bumper reinforcement. A vehicle front-rear direction inside end portion of the absorber main body is thereby supported from the vehicle front-rear direction inner side by the bumper reinforcement or the other member.

The pressure tube of the pressure tube-type pedestrian collision detection sensor is retained by the groove portion formed to the upper absorber, and extends along the vehicle width direction. During a collision between the vehicle and (the legs of) a pedestrian, a collision load diagonally toward the lower vehicle front-rear direction inner side acts on the upper absorber, and the pressure tube is pressed by the upper absorber. The pressure tube thereby deforms, and signals according to the change in pressure of the pressure tube are output from the pressure tube-type pedestrian collision detection sensor.

Note that the absorber upper end portion is integrally provided with the vehicle upper side of the absorber main body. Moreover, the absorber upper end portion includes the projecting portion, and the projecting portion projects toward the vehicle front-rear direction inner side with respect to the absorber main body at the vehicle upper side of the bumper reinforcement or the other member that fixes the absorber main body. The absorber upper end portion is thereby disposed further toward the vehicle upper side than the bumper reinforcement or the other member. Furthermore, the groove portion, open toward the vehicle front-rear direction inner side or the vehicle lower side, is formed at the vehicle front-rear direction inner side portion of the absorber main body, and the groove portion is disposed adjacent to the vehicle lower side of the absorber upper end portion. Namely, in the upper absorber, a vehicle upper side portion of the groove portion is configured by the absorber upper end portion.

In cases in which the groove portion is open toward the vehicle front-rear direction inner side, the groove portion is formed at a vehicle front-rear direction inside face of the absorber main body, such that only a vehicle lower side portion of the groove portion of the absorber main body is supported from the vehicle front-rear direction inner side by the bumper reinforcement or the other member. A reaction force from the vehicle front-rear direction outer face of the bumper reinforcement or the other member with respect to the collision load thereby only acts on the vehicle lower side portion of the groove portion of the absorber main body, and does not act on the absorber upper end portion. The absorber upper end portion is thereby displaced toward the vehicle front-rear direction inner side by the collision load, and the upper absorber presses the pressure tube in a desirable manner. This enables output from the pressure tube-type pedestrian collision detection sensor to be increased.

In cases in which the groove portion is open toward the vehicle lower side, a slit, open toward the lower side, is formed at the vehicle front-rear direction inner side portion of the absorber main body. Thus configuration can be made such that, when the collision load acts on the upper absorber, the upper absorber undergoes bending deformation with the vehicle upper side portion of the groove portion in the absorber upper end portion as the origin (this point is hereafter referred to as "deformation origin portion"). The pressure tube is thereby squeezed by the groove portion, and deforms. Thus, in cases in which the groove portion is open toward the vehicle lower side, the bending deformation of the absorber main body is utilized to press the pressure tube, thereby enabling the pressure tube to be stably deformed.

According to a second embodiment of the present invention, the groove portion may be open toward the vehicle front-rear direction inner side, and the projecting portion abuts an upper face of the bumper reinforcement or the other member that fixes the absorber main body, so as to be capable of relative movement in the vehicle front-rear direction.

According to the second embodiment of the present invention, in the upper absorber including the groove portion open toward the vehicle front-rear direction inner side, the projecting portion abuts the upper face of the bumper reinforcement or the other member, so as to be capable of relative movement in the vehicle front-rear direction. This enables foreign objects or the like to be suppressed or prevented from entering the pressure tube (groove portion) side from between the upper face of the bumper reinforcement or the other member, and the projecting portion.

According to a third embodiment of the present invention, the upper face of the bumper reinforcement or the other member is a flat surface. This enables the projecting portion to move smoothly on the bumper reinforcement or the other member.

According to a fourth embodiment of the present invention, an up-down dimension of a vehicle front-rear direction inside end portion of the absorber main body is set smaller than an up-down dimension of a vehicle front-rear direction outside end portion of the absorber main body.

According to the fourth embodiment of the present invention, compression deformation load resistance in the vehicle front-rear direction is set lower at the vehicle front-rear direction inner side end portion of the absorber main body than at the vehicle front-rear direction outside end portion of the absorber main body. Thus, configuration can be made such that during a collision between the vehicle and a pedestrian, the vehicle front-rear direction inside end portion of the absorber main body is deformed first, and the vehicle front-rear direction outside end portion of the absorber main body is deformed afterward. Thus collision load is absorbed by the portion with the large up-down dimension of the absorber main body after deformation of the pressure tube, thereby enabling protection performance with respect to the legs of a pedestrian to be increased.

According to the fifth embodiment, the up-down dimension of the vehicle front-rear direction inner side end portion is set smaller than the up-down dimension of a vehicle front-rear direction outside end portion by forming a step portion with a substantially reverse L-shaped cross-section that is open toward the vehicle front-rear direction inner side or a vehicle lower side at a lower end portion of the vehicle front-rear direction inside end portion. This enables the up-down dimension of the vehicle front-rear direction inside end portion to be easily set smaller than the up-down dimension of a vehicle front-rear direction outside end portion.

According to a sixth embodiment of the present invention, the groove portion is open toward the vehicle lower side, and the projecting portion is fixed to an upper face of the bumper reinforcement or the other member that fixes the absorber main body.

According to the sixth embodiment of the present invention, in the upper absorber including the groove portion open toward the vehicle lower side, the projecting portion is fixed to the upper face of the bumper reinforcement or the other member. Namely the projecting portion of the upper absorber is supported by the upper face of the bumper reinforcement or the other member, at a position at the vehicle front-rear direction inner side with respect to the deformation origin portion. This enables the upper absorber to efficiently undergo bending deformation with the deformation origin portion as the origin during a collision between the vehicle and a pedestrian. This enables the pressure tube to be stably deformed.

According to a seventh embodiment of the present invention, a lower absorber is provided at a vehicle lower side of the upper absorber, and the lower absorber is disposed adjacent to a vehicle front-rear direction outer face of the bumper reinforcement or the other member that fixes the absorber main body.

According to the seventh embodiment of the present invention, the upper absorber and the lower absorber are disposed aligned in the vehicle up-down direction. This enables a colliding body other than a pedestrian (for example, an on-road obstacle such as a roadside marker or a traffic marker post) entering the vehicle substantially horizontally during a collision with the vehicle to be borne by the upper absorber and the lower absorber. This enables, for example, false detection by the pressure tube-type pedestrian collision detection sensor to be suppressed.

According to an eighth embodiment of the present invention, the absorber main body is fixed to the bumper reinforcement via the other member, and the absorber upper end portion does not project further toward the vehicle upper side than an upper face of the bumper reinforcement.

According to the eighth embodiment of the present invention, the absorber upper end portion does not project further toward the vehicle upper side than the upper face of the bumper reinforcement, thereby enabling impedance of an airflow flowing at the vehicle upper side of the bumper reinforcement by the absorber upper end portion to be suppressed. Thus in cases in which the bumper reinforcement is disposed at the front end section of the vehicle, for example, good airflow can be achieved against a radiator or the like, disposed at the vehicle rear side of the bumper reinforcement.

According to a ninth embodiment of the present invention, a vehicle front-rear direction outer face of the absorber upper end portion is inclined toward the vehicle front-rear direction inner side on progression toward the vehicle upper side in a side view.

According to the ninth aspect of the present invention, the vehicle front-rear direction outer face of the absorber upper end portion is inclined toward the vehicle front-rear direction inner side on progression toward the vehicle upper side in side view, thereby enabling an increase in the size of the upper absorber to be suppressed.

According to a tenth embodiment of the present invention, the projecting portion extends continuously along the vehicle width direction. This enables the pressure tube to be stably and extensively deformed.

According to a eleventh embodiment of the present invention, the projecting portion forms intermittently along the vehicle width direction. This enables the weight of the upper absorber to be reduced.

The vehicle bumper structure including the pressure tube-type pedestrian collision detection sensor according to the first embodiment of the present invention enables the detection precision of the pedestrian collision detection sensor to be increased.

The vehicle bumper structure including the pressure tube-type pedestrian collision detection sensor according to the second embodiment of the present invention enables foreign objects or the like to be suppressed or prevented from entering the pressure tube (groove portion) side.

The vehicle bumper structure including the pressure tube-type pedestrian collision detection sensor according to the third embodiment of the present invention enables the projecting portion to move smoothly on the bumper reinforcement or the other member.

The vehicle bumper structure including the pressure tube-type pedestrian collision detection sensor according to the fourth embodiment of the present invention enables protection performance with respect to the legs of a pedestrian to be increased.

The vehicle bumper structure including the pressure tube-type pedestrian collision detection sensor according to the fifth embodiment of the present invention enables the up-down dimension of the vehicle front-rear direction inside end portion to be easily set smaller than the up-down dimension of a vehicle front-rear direction outside end portion.

The vehicle bumper structure including the pressure tube-type pedestrian collision detection sensor according to the sixth embodiment of the present invention enables the pressure tube to be stably deformed during a collision between the vehicle and a pedestrian.

The vehicle bumper structure including the pressure tube-type pedestrian collision detection sensor according to the seventh embodiment of the present invention enables false detection by the pressure tube-type pedestrian collision detection sensor to be suppressed.

The vehicle bumper structure including the pressure tube-type pedestrian collision detection sensor according to the eighth embodiment of the present invention enables impedance of an airflow flowing at the vehicle upper side of the bumper reinforcement by the absorber upper end portion to be suppressed.

The vehicle bumper structure including the pressure tube-type pedestrian collision detection sensor according to the ninth embodiment of the present invention enables an increase in the size of the upper absorber to be suppressed.

The vehicle bumper structure including the pressure tube-type pedestrian collision detection sensor according to the tenth embodiment of the present invention enables the pressure tube to be stably and extensively deformed.

The vehicle bumper structure including the pressure tube-type pedestrian collision detection sensor according to the eleventh embodiment of the present invention enables the weight of the upper absorber to be reduced.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
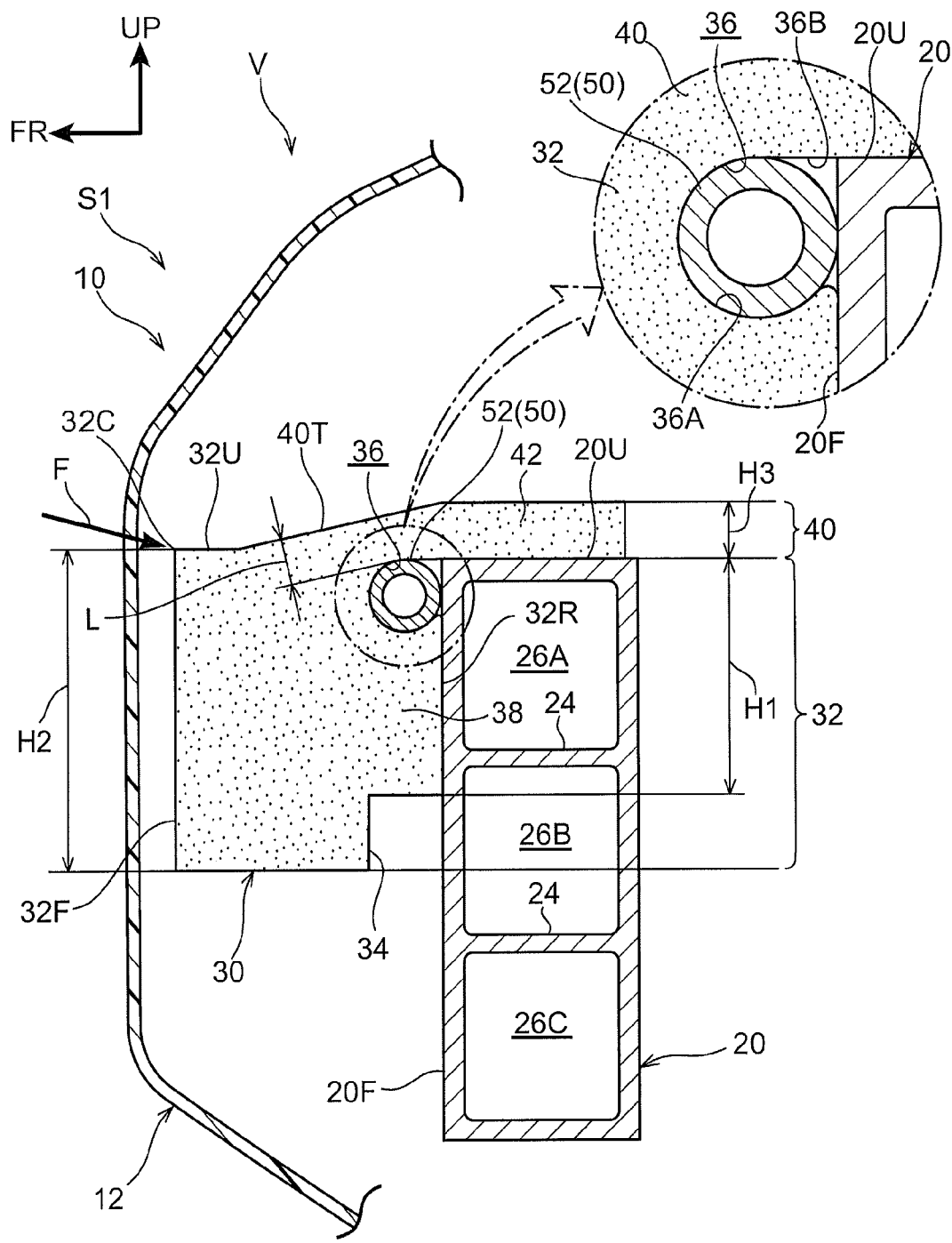
FIG. 1 is a schematic side cross-section view (an enlarged cross-section taken along line 1-1 in FIG. 2) illustrating the vicinity of a vehicle width direction center of a front bumper applied with a vehicle bumper structure including a pressure tube-type pedestrian collision detection sensor according to a first exemplary embodiment, as viewed from the vehicle left side.
Figure 2:
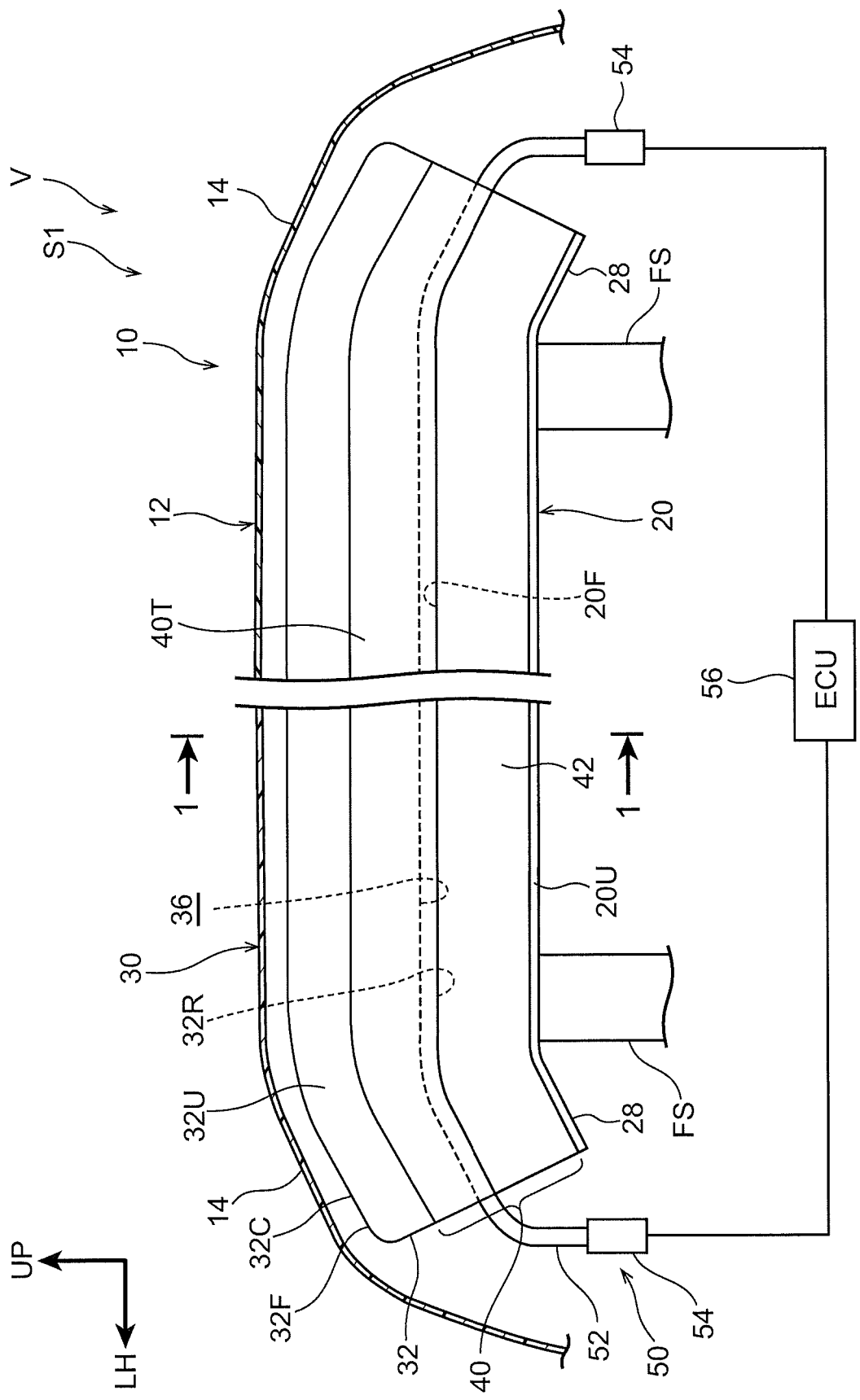
FIG. 2 is a partially cut-away schematic plan view illustrating the overall front bumper illustrated in FIG. 1.

Explanation follows regarding a front bumper 10 of a vehicle (automobile) V applied with a vehicle bumper structure S1 including a pressure tube-type pedestrian collision detection sensor 50 according to a first exemplary embodiment, with reference to FIG. 1 and FIG. 2. In the drawings, the arrow FR indicates the vehicle front side, the arrow LH indicates the vehicle left side (one vehicle width direction side), and the arrow UP indicates the vehicle upper side as appropriate. Unless otherwise stated, reference below simply to front-rear, up-down, and left-right directions refers to the front-rear of the vehicle front-rear direction, the up-down of the vehicle up-down direction, and the left and right of the vehicle (when facing forward).

As illustrated in FIG. 1 and FIG. 2, the front bumper 10 is disposed at a front end section of the vehicle V. Thus in the present exemplary embodiment, the "front side" corresponds to the "vehicle front-rear direction outer side" of technology disclosed herein, and the "rear side" corresponds to the "vehicle front-rear direction inner side" of technology disclosed herein. The front bumper 10 is configured including a bumper cover 12 configuring a front end of the vehicle V, bumper reinforcement 20 forming a bumper frame member, and an upper absorber 30 disposed at the rear side of the bumper cover 12. The front bumper 10 includes the pressure tube-type pedestrian collision detection sensor 50 (hereafter referred to as "collision detection sensor 50") for detecting a collision between the vehicle V and a colliding body. Explanation follows regarding configuration of each of the above.

Bumper Cover 12

As illustrated in FIG. 2, the bumper cover 12 is made of resin. The bumper cover 12 extends along the vehicle width direction, and is supported by being fixed to the vehicle body at a section not illustrated in the drawings. Both vehicle width direction side sections 14 of the bumper cover 12 are inclined toward the rear side on progression toward the vehicle width direction outsides in plan view, configuring corner sections of the vehicle V.

Bumper Reinforcement 20

The bumper reinforcement 20 is formed in a hollow substantially rectangular column shape, and is disposed with its length direction running along the vehicle width direction. The bumper reinforcement 20 is configured, for example, by an aluminum-based metal material, and is manufactured by a method such as extrusion forming. As illustrated in FIG. 1, plate shaped reinforcement portions 24 are provided inside the bumper reinforcement 20. The reinforcement portions 24 are disposed with their plate thickness direction running along the up-down direction, and couple together a front wall and a rear wall of the bumper reinforcement 20. A cross-section structure of the bumper reinforcement 20 configures a cross-section structure in which plural (three in the present exemplary embodiment) substantially rectangular shaped closed cross-sections are aligned in the up-down direction. Namely, in the present exemplary embodiment, a pair of the reinforcement portions 24 is disposed aligned in the up-down direction inner side the bumper reinforcement 20. The closed cross-section disposed at an upper portion of the bumper reinforcement 20 configures an upper side closed cross-section 26A, the closed cross-section disposed at an up-down direction intermediate portion of the bumper reinforcement 20 configures an intermediate closed cross-section 26B, and the closed cross-section disposed at a lower portion of the bumper reinforcement 20 configures a lower side closed cross-section 26C.

As illustrated in FIG. 2, a pair of left and right front side members FS, configuring vehicle body side frame members, extend along the front-rear direction at the rear side of the bumper reinforcement 20. Side portions at both vehicle width direction ends of the bumper reinforcement 20 are coupled to front ends of the respective front side members FS. Both vehicle width direction end portions of the bumper reinforcement 20 project out toward the vehicle width direction outsides with respect to the front side members FS, and bend diagonally toward the rear side corresponding to both vehicle width direction side sections 14 of the bumper cover 12. These bent portions configure bent portions 28.

Upper Absorber 30

As illustrated in FIG. 1, the upper absorber 30 is configured of a foamed resin material, namely urethane foam. The upper absorber 30 is configured including an absorber main body 32, and an absorber upper end portion 40 that configures an upper end portion of the upper absorber 30. The absorber main body 32 is disposed between the bumper cover 12 and the bumper reinforcement 20, adjacent to the front side of the upper portion (namely the portion configuring the upper side closed cross-section 26A) of the bumper reinforcement 20. The absorber main body 32 is formed in an elongated shape with its length direction along the vehicle width direction so as to follow the bumper cover 12 in plan view, and both vehicle width direction side portions of the absorber main body 32 bend diagonally toward the rear side corresponding to the bent portions 28 of the bumper reinforcement 20.

The absorber main body 32 is formed in a substantially rectangular shape in a cross-section viewed along its length direction, and a rear face 32R of the absorber main body 32 is fixed to a front face (vehicle front-rear direction outer face of the bumper reinforcement) 20F of the bumper reinforcement 20. An up-down position of an upper face 32U of the absorber main body 32 and an up-down position of an upper face 20U of the bumper reinforcement 20 are set so as to be aligned with each other. Namely, in the vehicle up-down direction, a position of the upper face 32U and a position of the upper face 20U are set so as to be aligned with each other. A corner portion at a boundary portion of the absorber main body 32 between a front face 32F and the upper face 32U configures a corner portion 32C.

A step portion 34 is formed at a lower end portion of a rear end portion of the absorber main body 32, and the step portion 34 is formed with a substantially reverse L-shaped cross-section that is open toward the lower side and rear side. An up-down dimension (up-down dimension of a vehicle front-rear direction inside end portion of the absorber main body) H1 of the rear end portion of the absorber main body 32 is thereby set smaller than an up-down dimension (up-down dimension of a vehicle front-rear direction outside end portion of the absorber main body) H2 of a front end portion of the absorber main body 32.

The absorber upper end portion 40 is integrally provided at the upper side of the absorber main body 32. The absorber upper end portion 40 is formed in a substantially trapezoidal shape in a cross-section viewed along its length direction, and is formed contiguously across the length direction of the absorber main body 32. A rear portion of the absorber upper end portion 40 projects out toward the rear side with respect to the absorber main body 32, and this projecting portion configures a projecting portion 42. The projecting portion 42 is formed in a substantially rectangular shape in a cross-section viewed along its length direction, and is disposed adjacent to the upper side of the upper face 20U of the bumper reinforcement 20. The projecting portion 42 thereby abuts the upper face 20U of the bumper reinforcement 20, and is configured capable of moving in the front-rear direction relative to the upper face 20U. An up-down dimension H3 of the absorber upper end portion 40 (projecting portion 42) is set at the minimum dimension required in order to mold the upper absorber 30 (at 15 mm in the present exemplary embodiment as an example).

A front face of the absorber upper end portion 40 configures a tapered face (vehicle front-rear direction outer face of an absorber upper end portion) 40T inclined toward the rear side on progression toward the upper side in side view. A front end of the tapered face 40T is connected to a front-rear direction intermediate portion of the upper face 32U of the absorber main body 32. A (minimum) distance L between the tapered face 40T and a groove portion 36, described below, is configured so as to match the up-down dimension H3 of the absorber upper end portion 40 (projecting portion 42). Note that the distance L between the tapered face 40T and the groove portion 36 may be set greater than the up-down dimension H3 of the absorber upper end portion 40 (projecting portion 42).

The groove portion 36 is formed to the rear face 32R of the absorber main body 32 in order to retain a pressure tube 52, described later. The groove portion 36 pierces through the length direction of the absorber main body 32, and is formed in a substantially C shaped groove shape open toward the rear side in a side cross-section view. Specifically, the groove portion 36 is configured including a circular shaped circular arc portion 36A partially open toward the rear side in side cross-section view, and a side face 36B extending from an upper end of the circular arc portion 36A toward the rear side. Thus an upper side portion of an open portion of the groove portion 36 is configured by the side face 36B, and a lower side portion of the open portion of the groove portion 36 is configured by the circular arc portion 36A. The groove portion 36 is disposed adjacent to the lower side of the absorber upper end portion 40. The side face 36B of the groove portion 36 is thereby aligned with a lower face of the absorber upper end portion 40, and a lower face of the projecting portion 42 and the side face 36B are disposed in the same plane. Namely, in the upper absorber 30, the upper side portion of the groove portion 36 is configured by the absorber upper end portion 40. The groove portion 36 is disposed facing an upper edge portion of the front face 20F of the bumper reinforcement 20 along the front-rear direction. A groove lower portion 38 configures a portion of the absorber main body 32 configuring the lower side of the groove portion 36, and the groove lower portion 38 is supported from the rear side by the front face 20F of the bumper reinforcement 20.

Collision Detection Sensor 50

As illustrated in FIG. 2, the collision detection sensor 50 is configured including the pressure tube 52 formed in an elongated shape, and pressure sensors 54 (elements broadly understood to be "pressure detectors") that output signals according to a change in pressure in the pressure tube 52.

As illustrated in FIG. 1, the pressure tube 52 is configured as a hollow body structure with a substantially circular ring shaped cross-section. An outer diameter dimension of the pressure tube 52 is set slightly smaller than an inner diameter dimension of the circular arc portion 36A of the groove portion 36, and the length direction length of the pressure tube 52 is set longer than the length direction length of the upper absorber 30. The pressure tube 52 is installed (fitted) inside the groove portion 36. The pressure tube 52 is thereby disposed facing the upper edge portion of the front face 20F of the bumper reinforcement 20 in the front-rear direction. Note that, in a state in which the pressure tube 52 has been installed inside the groove portion 36, an outer circumferential face of the pressure tube 52 either abuts the front face 20F of the bumper reinforcement 20, or a slight gap is formed between the outer circumferential face of the pressure tube 52 and the front face 20F.

As illustrated in FIG. 2, the pressure sensors 54 are provided at both vehicle width direction ends of the pressure tube 52, and are electrically connected to an ECU 56 (an element broadly understood to be a "collision determination section"). Signals are output from the pressure sensors 54 to the ECU 56 according to the change in pressure inside the pressure tube 52 when the pressure tube 52 deforms.

A collision speed sensor (not illustrated in the drawings) is also electrically connected to the ECU 56 previously mentioned, and the collision speed sensor outputs a signal, according to collision speed with a colliding body, to the ECU 56. The ECU 56 then computes the collision load based on the output signals of the pressure sensors 54 previously described, and computes the collision speed based on the output signal of the collision speed sensor. The ECU 56 then derives an effective mass of the colliding body from the computed collision load and collision speed, determines whether or not the effective mass exceeds a threshold value, and determines whether the body colliding with the front bumper 10 is a pedestrian, or an object other than a pedestrian (for example, an on-road obstacle such as a roadside marker or a traffic marker post).

Explanation follows regarding operation and advantageous effects of the first exemplary embodiment.

In the front bumper 10 configured as described above, the pressure tube 52 is installed (fitted) inside the groove portion 36 formed to the upper absorber 30, and the pressure tube 52 extends along the vehicle width direction. In the event of a collision between the vehicle V (the front bumper 10) and (the legs of) a pedestrian, the pedestrian tends to fall on the hood of the vehicle V. The bumper cover 12 thereby deforms so as to tilt toward the rear side, and mainly presses the corner portion 32C of the upper absorber 30. A collision load F diagonally toward the lower rear (see FIG. 1) is accordingly input from the bumper cover 12 to the upper absorber 30. The pressure tube 52 is accordingly pressed by the upper absorber 30, and pressure inside the pressure tube 52 changes.

When the pressure inside the pressure tube 52 changes, the pressure sensors 54 output signals corresponding to the pressure change in the pressure tube 52 to the ECU 56, and the ECU 56 computes the collision load based on the output signals from the pressure sensors 54. The ECU 56 also computes the collision speed based on the output signal from the collision speed sensor. The ECU 56 then derives the effective mass of the colliding body from the computed collision load and collision speed, determines whether or not the effective mass exceeds the threshold value, and thereby determines whether or not the body colliding with the front bumper 10 is a pedestrian.

Note that the upper absorber 30 is configured including the absorber main body 32 fixed to the front face 20F at the upper portion of the bumper reinforcement 20, and the absorber upper end portion 40 integrally provided at the upper side of the absorber main body 32. The absorber upper end portion 40 includes the projecting portion 42, and the projecting portion 42 projects toward the rear side with respect to the absorber main body 32 at the upper side of the bumper reinforcement 20. The groove portion 36 open toward the rear side is formed to the rear face 32R of the absorber main body 32, and the groove portion 36 is disposed adjacent to the lower side of the absorber upper end portion 40. Thus in the upper absorber 30, the absorber upper end portion 40 configures the upper side portion of the groove portion 36, and configuration is such that the absorber upper end portion 40 does not abut the front face 20F of the bumper reinforcement 20.

When the collision load F diagonally toward the lower rear acts on the upper absorber 30, a reaction force does not act on the absorber upper end portion 40 from the front face 20F of the bumper reinforcement 20, and so the absorber upper end portion 40 is displaced toward the rear side without being impeded by the front face 20F of the bumper reinforcement 20, and the pressure tube 52 is pressed toward the rear side by an upper portion of the absorber main body 32 in a desirable manner. This enables output from the pressure sensors 54 to be increased during a collision between the vehicle V and a pedestrian.

Explanation follows regarding this point, with comparison to a Comparative Example configured similarly to the related art. Namely, in an absorber of the Comparative Example, upper side and lower side portions of a groove portion are configured so as to abut a front face of bumper reinforcement. In the Comparative Example, when collision load acts on the absorber diagonally toward the lower rear, reaction force from the front face of the bumper reinforcement acts on the upper side and lower side portions of the groove portion of the absorber (namely, two, these being upper and lower, locations of the absorber). Specifically, since the acting direction of the collision load is diagonally toward the lower rear, the reaction force acting on the upper side portion of the groove portion is greater than the reaction force acting on the lower side portion of the groove portion. The upper side and lower side portions of the groove portion of the absorber are pressed and squashed due to this reaction force, and the absorber is thereby displaced toward the rear side and presses against a pressure tube. The pressure tube is accordingly deformed.

In contrast thereto, in the present exemplary embodiment as previously described, the absorber upper end portion 40, configuring the upper side of the groove portion 36, is configured so as not to abut the front face 20F of the bumper reinforcement 20. Thus, when the collision load F acts diagonally toward the lower rear on the upper absorber 30, the reaction force from the front face 20F of the bumper reinforcement 20 only acts on the groove lower portion 38 of the absorber main body 32, and does not act on the absorber upper end portion 40. Namely, in contrast to the Comparative Example, the reaction force from the front face 20F can be made to act on the absorber main body 32 at a single location.

Moreover, in a collision between the vehicle V and a pedestrian, the bumper cover 12 tilts toward the rear side and mainly hits the corner portion 32C of the absorber main body 32 as described above, such that the collision load F diagonally toward the lower rear mainly acts on the upper portion of the absorber main body 32. Thus the absorber upper end portion 40, on which the reaction force from the front face 20F does not act, is displaced toward the rear side relative to the bumper reinforcement 20 due to the collision load F, and the pressure tube 52 is pressed in a desirable manner by the upper portion of the absorber main body 32. This enables the output from the pressure sensors 54 during a collision between the vehicle V and a pedestrian to be increased. This enables the detection precision of the collision detection sensor 50 to be increased.

In the present exemplary embodiment, the pressure tube 52 (groove portion 36) is disposed adjacent to the front side of the upper edge portion of the front face 20F of the bumper reinforcement 20. Namely, the up-down position of the pressure tube 52 (groove portion 36) can be set further to the upper side than in the Comparative Example. This point also enables the detection precision of the collision detection sensor 50 during a collision between the vehicle V and a pedestrian to be increased. Specific explanation follows below.

Namely, during a collision between the vehicle V and a pedestrian, the position of the center of gravity of the pedestrian is generally positioned further toward the upper side than the bumper reinforcement 20. Thus, in order to increase the detection precision of the collision detection sensor 50 during a collision between the vehicle V and a pedestrian, it is desirable to set the up-down position of the pressure tube 52 near to the position of the center of gravity of the pedestrian (namely, further toward the upper side than the bumper reinforcement 20).

However, since the upper absorber 30 is configured of foamed resin material, the minimum dimension required in order to mold the upper absorber 30 needs to be secured at each location of the upper absorber 30. Thus in the absorber of the Comparative Example, the minimum dimension at which the upper side portion of the groove portion can be molded needs to be secured. Thus the groove portion that retains the pressure tube is disposed toward the lower side of the upper face of the absorber by the amount of this minimum dimension. Thus the pressure tube (groove portion) is disposed toward the lower side with respect to the upper edge portion of the front face of the bumper reinforcement.

In contrast thereto, the upper absorber 30 of the present exemplary embodiment is provided with the absorber upper end portion 40, thereby enabling the groove portion 36 to be formed at an upper edge portion of the rear face 32R of the absorber main body 32. This enables the pressure tube 52 (groove portion 36) to be disposed adjacent to the upper edge portion of the front face 20F of the bumper reinforcement 20. The up-down position of the pressure tube 52 (groove portion 36) is thereby nearer to the position of the center of gravity of the pedestrian than in the Comparative Example, thereby enabling the detection precision of the collision detection sensor 50 during a collision between the vehicle V and a pedestrian to be increased.

Furthermore, in the event of a collision between the front bumper 10 and an on-road obstacle that is a colliding body other than a pedestrian, the on-road obstacle enters the vehicle V substantially horizontally, such that the bumper cover 12 presses the front face 32F of the absorber main body 32 substantially horizontally toward the rear side. Thus reaction force from the bumper reinforcement 20 acts substantially uniformly on the rear face 32R of the absorber main body 32 (groove lower portion 38). Thus, for example, by setting the up-down dimension H1 of the rear end portion of the absorber main body 32 (namely, the contact surface area between the rear face 32R and the front face 20F of the bumper reinforcement 20) to be the same as an up-down dimension of a rear end portion of the absorber of the Comparative Example, load required for compression deformation of the groove lower portion 38 can be set the same as load required for compression deformation of the rear end portion of the absorber of the Comparative Example. Namely, sensitivity of the pressure tube 52 when a colliding body other than a pedestrian collides with the front bumper 10 can be set the same as in the Comparative Example. This enables the detection precision of the collision detection sensor 50 when detecting a colliding body other than a pedestrian to be maintained.

The absorber upper end portion 40 includes the projecting portion 42, and the projecting portion 42 projects toward the rear side with respect to the absorber main body 32, and abuts the upper face 20U of the bumper reinforcement 20 so as to be capable of moving in the front-rear direction relative to the upper face 20U. This enables foreign objects or the like to be prevented or suppressed from entering the pressure tube 52 side from between the upper face 20U of the bumper reinforcement 20 and the projecting portion 42. This enables the pressure tube 52 to be prevented or suppressed from being scratched, etc.

The step portion 34 is formed at the lower end portion of the rear end portion of the absorber main body 32, and the up-down dimension H1 at the rear end portion of the absorber main body 32 is set smaller than the up-down dimension H2 at the front end portion of the absorber main body 32. This enables protection performance with respect to the legs of a pedestrian during a collision between the vehicle V and the pedestrian to be increased.

Namely, in the absorber main body 32 as described above, the up-down dimension H1 at the rear end portion of the absorber main body 32 is set smaller than the up-down dimension H2 at the front end portion of the absorber main body 32. The compression deformation load resistance at the rear end portion of the absorber main body 32 (groove lower portion 38) is thereby lower than the compression deformation load resistance at a front side portion of the absorber main body 32 (namely, a portion further to the front side than the step portion 34). Thus, when the collision load F is input to the upper absorber 30 during a collision between the vehicle V and a pedestrian, the groove lower portion 38 undergoes compression deformation first, and the front side portion of the absorber main body 32 undergoes compression deformation afterward. Thus the collision load F is absorbed by the front side portion of the absorber main body 32 with the large up-down dimension after deformation of the pressure tube 52, thereby enabling protection performance with respect to the legs of a pedestrian to be increased.

The tapered face 40T is formed to the front face of the absorber upper end portion 40, and the tapered face 40T is inclined toward the rear side on progression toward the upper side in side cross-section view. The front end of the tapered face 40T is connected to the front-rear direction intermediate portion of the upper face 32U of the absorber main body 32. This enables an increase in the size of the upper absorber 30 to be suppressed.

The up-down dimension H3 of the absorber upper end portion 40 is set at the minimum dimension required in order to mold the upper absorber 30. This enables configuration such that the absorber upper end portion 40 does not project out toward the upper side of the bumper reinforcement 20 any more than required. This point also enables an increase in the size of the upper absorber 30 to be suppressed.

Second Exemplary Embodiment

Figure 3:
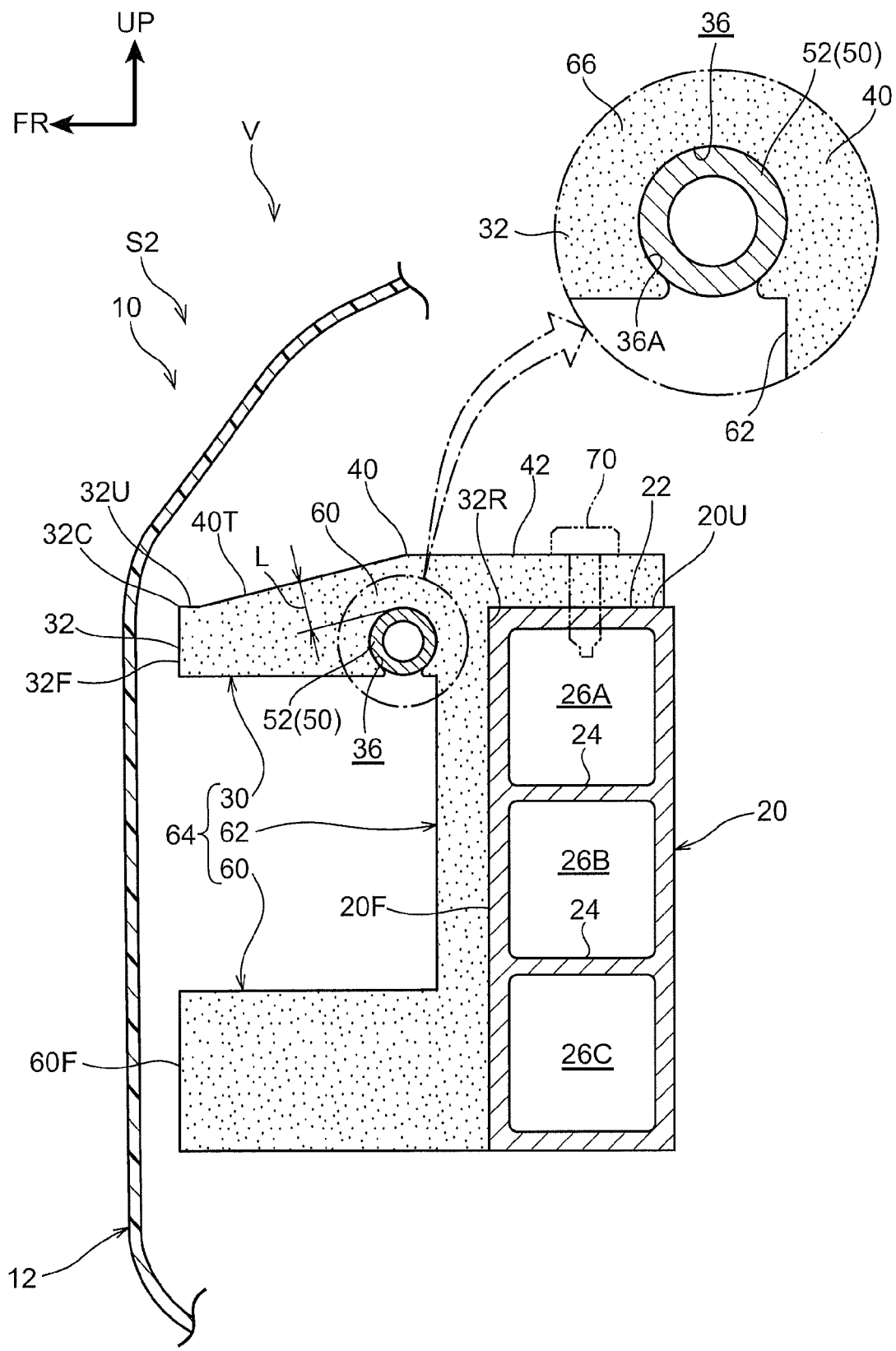
FIG. 3 is a schematic side cross-section view corresponding to FIG. 1, illustrating the vicinity of the vehicle width direction center of a front bumper applied with a vehicle bumper structure including a pressure tube-type pedestrian collision detection sensor according to a second exemplary embodiment.

Explanation follows regarding a vehicle bumper structure S2 including a collision detection sensor 50 according to a second exemplary embodiment, with reference to FIG. 3. The second exemplary embodiment is configured similarly to the first exemplary embodiment, with the exception of the points described below. Note that same reference numerals are appended to components with similar configurations to those in the first exemplary embodiment.

Namely, in the second exemplary embodiment, a lower absorber 60 is provided at the lower side of the upper absorber 30. The upper absorber 30 and the lower absorber 60 are coupled together as a single unit by a coupling section 62, and an absorber 64 is configured by the upper absorber 30, the lower absorber 60, and the coupling section 62. Specific explanation follows below.

In the upper absorber 30, the up-down dimension of the absorber main body 32 is set smaller than in the first exemplary embodiment, and the step portion 34 and the groove lower portion 38 are omitted from the absorber main body 32. The groove portion 36 of the absorber main body 32 is open toward the lower side, and is disposed separated by a specific distance (specifically, the minimum dimension required in order to mold the upper absorber 30) toward the front side with respect to the rear face 32R of the absorber main body 32. The side face 36B of the groove portion 36 of the first exemplary embodiment is omitted from this groove portion 36, and the groove portion 36 is configured only by the circular arc portion 36A partially open toward the lower side. The projecting portion 42 of the absorber main body 32 is fixed to an upper wall 22 (upper face 20U) of the bumper reinforcement 20 by a clip 70.

Similarly to the upper absorber 30, the lower absorber 60 is formed in an elongated shape with its length direction along the vehicle width direction, and is formed in a substantially rectangular shape in a cross-section view viewed along its length direction. The lower absorber 60 is disposed adjacent to the front side of the lower portion (specifically, the portion configuring the lower side closed cross-section 26C) of the bumper reinforcement 20. A front-rear position of a front face 60F of the lower absorber 60 is aligned with a front-rear position of the front face 32F of the absorber main body 32. Note that the front face 60F of the lower absorber 60 may be set further toward the front side than the front face 32F of the absorber main body 32.

The coupling section 62 is formed in a substantially rectangular plate shape with its plate thickness direction along the front-rear direction, and is disposed adjacent to the front side of the bumper reinforcement 20 between the upper absorber 30 and the lower absorber 60. An upper end of the coupling section 62 is joined to the upper absorber 30, and a lower end of the coupling section 62 is joined to the lower absorber 60, such that the upper absorber 30, the lower absorber 60, and the coupling section 62 are configured as an integral unit.

In the second exemplary embodiment, a location of the absorber upper end portion 40 at the upper side of the groove portion 36 configures a deformation origin portion 66. Configuration is such that, when a collision load F of a specific value or above acts on the upper absorber 30, the upper absorber 30 undergoes bending deformation with the deformation origin portion 66 as the origin, and a front side portion of the upper absorber 30 tilts toward the lower side. Specifically, the front-rear length of the absorber main body 32, the distance L between the groove portion 36 and the tapered face 40T, and the hardness of the upper absorber 30, etc. are set as appropriate such that the upper absorber 30 undergoes bending deformation with the deformation origin portion 66 as the origin in collision testing of the vehicle V using a crash test dummy.

Similarly to in the first exemplary embodiment, during a collision between the vehicle V (front bumper 10) and (the legs of) a pedestrian, the bumper cover 12 mainly presses the corner portion 32C of the upper absorber 30, and collision load F diagonally toward the lower rear is input to the upper absorber 30 from the bumper cover 12. When the collision load F is input to the upper absorber 30, the upper absorber 30 undergoes bending deformation with the deformation origin portion 66 as the origin, and the front side portion of the upper absorber 30 tilts toward the lower side. The pressure tube 52 is thereby squeezed between a front side portion and a rear side portion of the circular arc portion 36A of the groove portion 36, and deforms. Thus in the second exemplary embodiment, the bending deformation of the upper absorber 30 is utilized to deform the pressure tube 52, thereby enabling the pressure tube 52 to be deformed by a relatively small collision load F. Thus in the second exemplary embodiment also, output from the pressure sensors 54 during a collision between the vehicle V and a pedestrian is increased, thereby enabling the detection precision of the collision detection sensor 50 to be increased.

In the second exemplary embodiment, the pressure tube 52 is deformed by bending deformation of the upper absorber 30. Thus setting a long front-rear length of the absorber main body 32 enables the bending deformation load of the upper absorber 30 to be further reduced. This enables the precision detection of the collision detection sensor 50 to be effectively increased, compared to, for example, a vehicle in which the distance in the front-rear direction between the bumper reinforcement 20 and the bumper cover 12 is comparatively long. Moreover, since the bending deformation of the upper absorber 30 is utilized to deform the pressure tube 52, the pressure tube 52 can be stably deformed.

The projecting portion 42 is fixed to the upper wall 22 of the bumper reinforcement 20 by the clip 70. The projecting portion 42 is thereby supported by the bumper reinforcement 20 at the rear side of the deformation origin portion 66. Thus when the collision load F diagonally toward the lower rear is input to the corner portion 32C of the upper absorber 30, the projecting portion 42 can be suppressed from lifting up off the upper face 20U of the bumper reinforcement 20. This enables the upper absorber 30 to effectively undergo bending deformation at the position of the deformation origin portion 66, thereby enabling stable deformation of the pressure tube 52.

In the absorber 64, the lower absorber 60 is provided at the lower side of the upper absorber 30, and the upper absorber 30 and the lower absorber 60 are disposed aligned with each other in the up-down direction. This enables a colliding body other than a pedestrian entering the vehicle V substantially horizontally during a collision with the vehicle V to be borne by the upper absorber 30 and the lower absorber 60. This enables false detection by the collision detection sensor 50 to be suppressed.

In the absorber 64, the upper absorber 30 and the lower absorber 60 are coupled together as an integral unit by the coupling section 62. This enables the upper absorber 30 and the lower absorber 60 to be fixed to the bumper reinforcement 20 at the same time. This enables greater ease of operation when the upper absorber 30 and the lower absorber 60 are fixed to the bumper reinforcement 20.

Third Exemplary Embodiment

Figure 4:
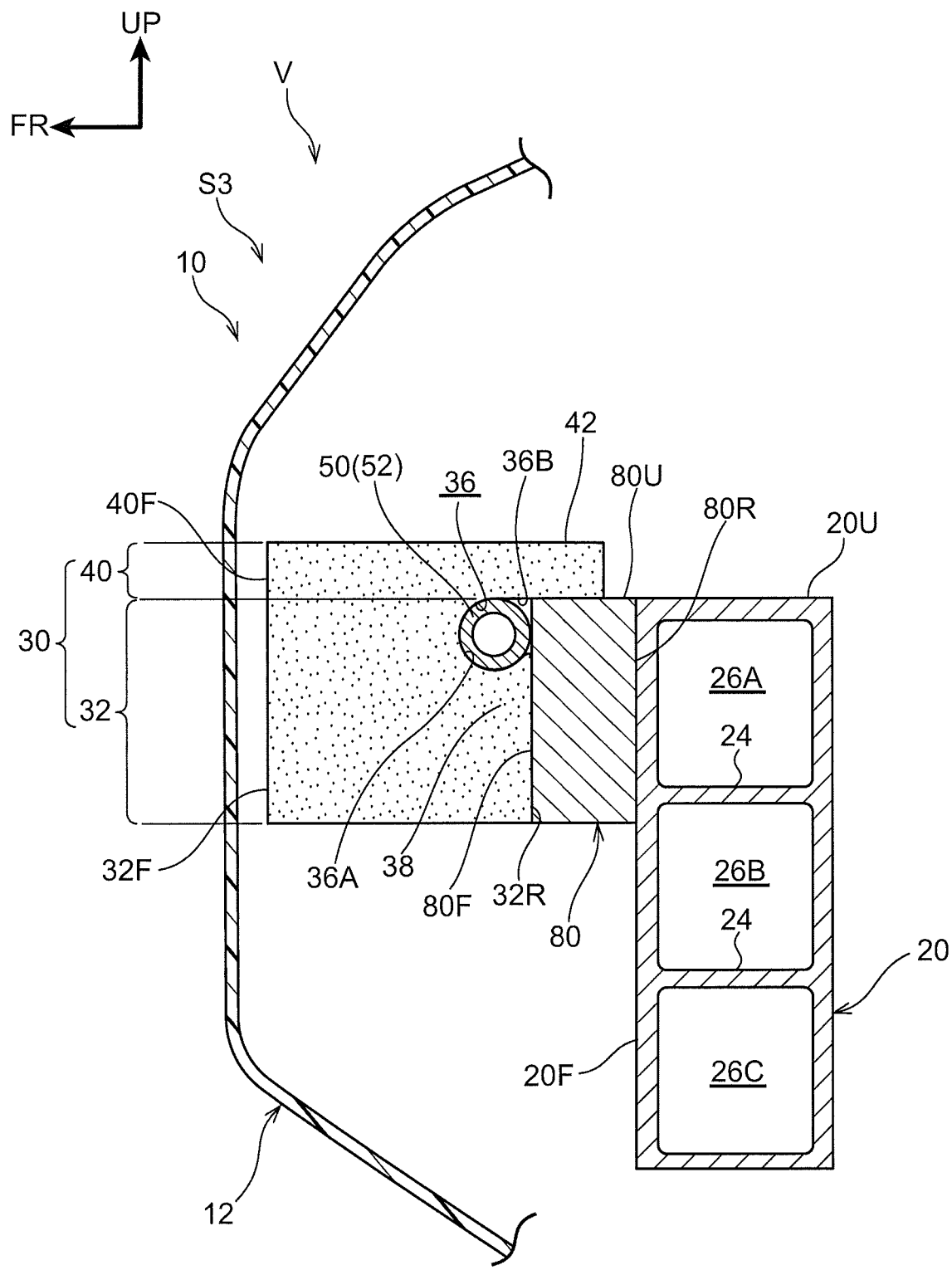
FIG. 4 is a schematic side cross-section view corresponding to FIG. 1, illustrating the vicinity of the vehicle width direction center of a front bumper applied with a vehicle bumper structure including a pressure tube-type pedestrian collision detection sensor according to a third exemplary embodiment.

Explanation follows regarding a vehicle bumper structure S3 including a collision detection sensor 50 according to a third exemplary embodiment, with reference to FIG. 4. The third exemplary embodiment is similarly configured to the first exemplary embodiment, with the exception of the points described below. Note that same reference numerals are appended to components with similar configurations to those in the first exemplary embodiment.

Namely, in the third exemplary embodiment, a bracket 80, serving as "another member" is provided between the bumper reinforcement 20 and the upper absorber 30. In other words, the upper absorber 30 is fixed to the front face 20F of the bumper reinforcement 20 through the bracket 80.

The bracket 80 is formed in an elongated shape with its length direction along the vehicle width direction, and is disposed following the front face 20F of the bumper reinforcement 20. The bracket 80 is formed in a substantially rectangular shape in a cross-section viewed along its length direction, and a rear face 80R of the bracket 80 is fixed to the front face 20F at the upper portion of the bumper reinforcement 20. An up-down position of an upper face 80U of the bracket 80 (an upper face of the other member) is aligned with the up-down position of the upper face 20U of the bumper reinforcement 20.

In the upper absorber 30, the step portion 34 is omitted from the absorber main body 32. Moreover, the tapered face 40T is omitted from the absorber upper end portion 40, and the absorber upper end portion 40 is formed in a substantially rectangular shape with its length direction along the front-rear direction in side cross-section view. A front face 40F of the absorber upper end portion 40 is disposed in the same plane as the front face 32F of the absorber main body 32.

The rear face 32R of the absorber main body 32 (groove lower portion 38) is fixed to a front face (a vehicle front-rear direction outer face of the other member) 80F of the bracket 80. The projecting portion 42 of the absorber upper end portion 40 abuts the upper face 80U of the bracket 80 so as to be capable of moving in the front-rear direction relative to the upper face 80U, and a rear end of the projecting portion 42 does not extend as far as the front face 20F of the bumper reinforcement 20. The groove portion 36 (pressure tube 52) is disposed facing an upper edge portion of the front face 80F of the bracket 80 in the front-rear direction. Thus in the upper absorber 30, similarly to in the first exemplary embodiment, only the groove lower portion 38 of the absorber main body 32 is supported from the rear side, by the front face 80F of the bracket 80. This enables similar operation and advantageous effects to be exhibited in the third exemplary embodiment as in the first exemplary embodiment.

In the third exemplary embodiment, the upper absorber 30 is fixed to the front face 20F of the bumper reinforcement 20 through the bracket 80. This enables the upper absorber 30 to be disposed further to the vehicle front side than in the first exemplary embodiment. Thus, for example, in a vehicle with a comparatively long distance in the front-rear direction between the bumper cover 12 and the bumper reinforcement 20, the upper absorber 30 can be installed in the vehicle without changing the front-rear direction length of the upper absorber 30.

Figure 5:
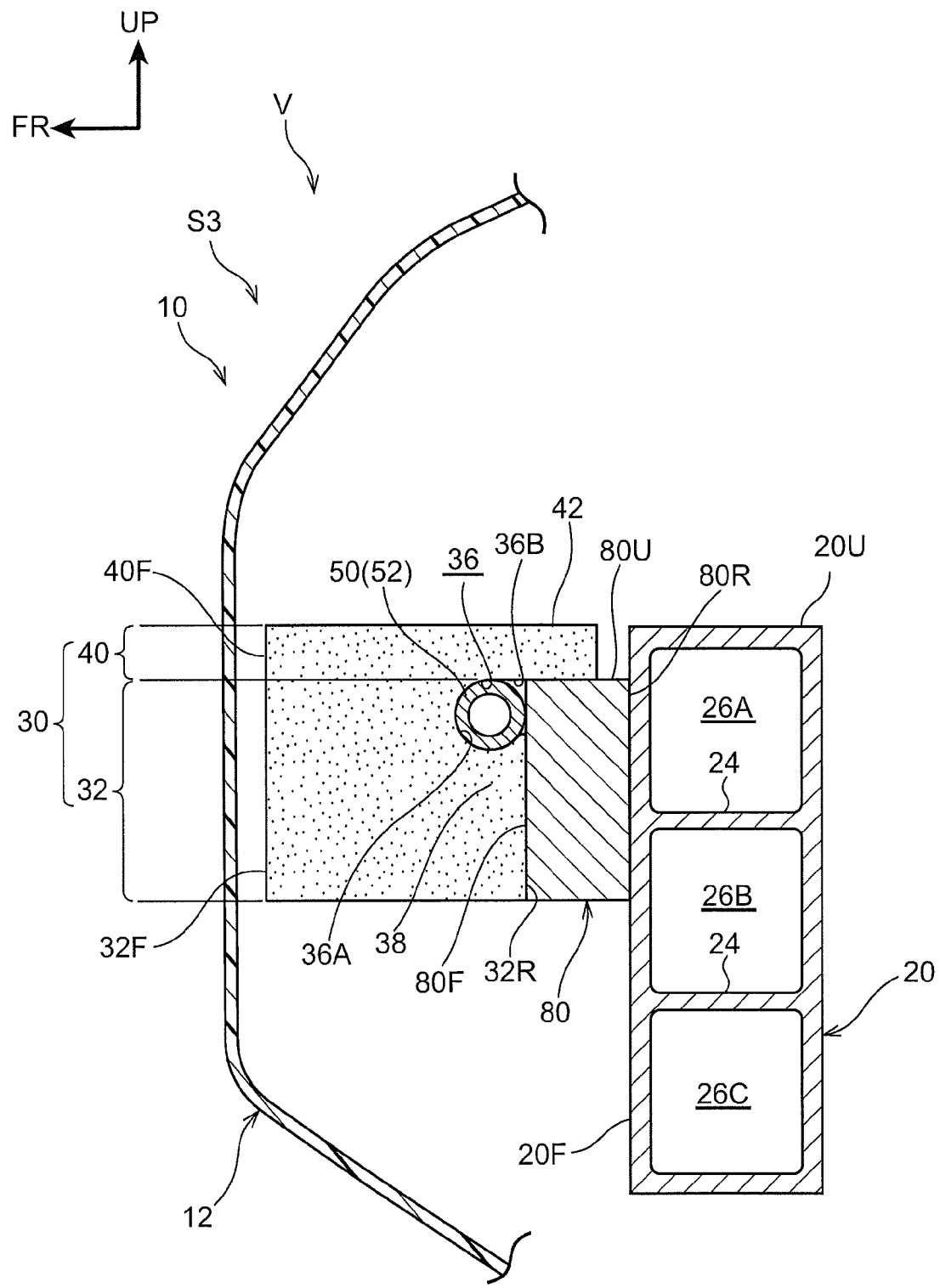
FIG. 5 is a schematic side cross-section view corresponding to FIG. 4, illustrating a modified example of up-down positions of a bracket and an upper absorber illustrated in FIG. 4.

Note that, although in the third exemplary embodiment the up-down position of the upper face 80U of the bracket 80 is set so as to be aligned with the up-down position of the upper face 20U of the bumper reinforcement 20 (in the vehicle up-down direction, although a position of the upper face 80U and a position of the upper face 20U are set so as to be aligned with each other), the up-down position of the bracket 80 may be changed as appropriate according to each vehicle type. As illustrated in FIG. 5, for example, the upper face 80U of the bracket 80 may be disposed further toward the lower side than the upper face 20U of the bumper reinforcement 20. In such cases, configuration may be such that the absorber upper end portion 40 does not project out further toward the upper side than the upper face 20U of the bumper reinforcement 20. This enables an airflow flowing through a bumper grille (not illustrated in the drawings) fixed to the bumper cover 12 into an engine room of the vehicle V to be suppressed from being impeded by the absorber upper end portion 40. Thus since the airflow flows at the upper side of the bumper reinforcement 20 without being impeded by the absorber upper end portion 40, good airflow can be achieved against a radiator (not illustrated in the drawings) disposed at the rear side of the bumper reinforcement 20.

Although not illustrated in the drawings, a configuration may be applied in which the upper face 80U of the bracket 80 is disposed further toward the upper side than the upper face 20U of the bumper reinforcement 20. In such cases, the up-down position of the pressure tube 52 is even nearer the position of the center of gravity of the pedestrian, thereby enabling the detection precision of the collision detection sensor 50 to be further increased.

Although in the third exemplary embodiment, the upper absorber 30 of the first exemplary embodiment is fixed to the bracket 80, a configuration may be applied in which the absorber 64 of the second exemplary embodiment is fixed to the bracket 80. In such cases, the bracket 80 may be extended further toward the lower side than in the third exemplary embodiment, and the projecting portion 42 of the absorber upper end portion 40 may be fixed to the upper face 80U of the bracket 80.

Figure 6:
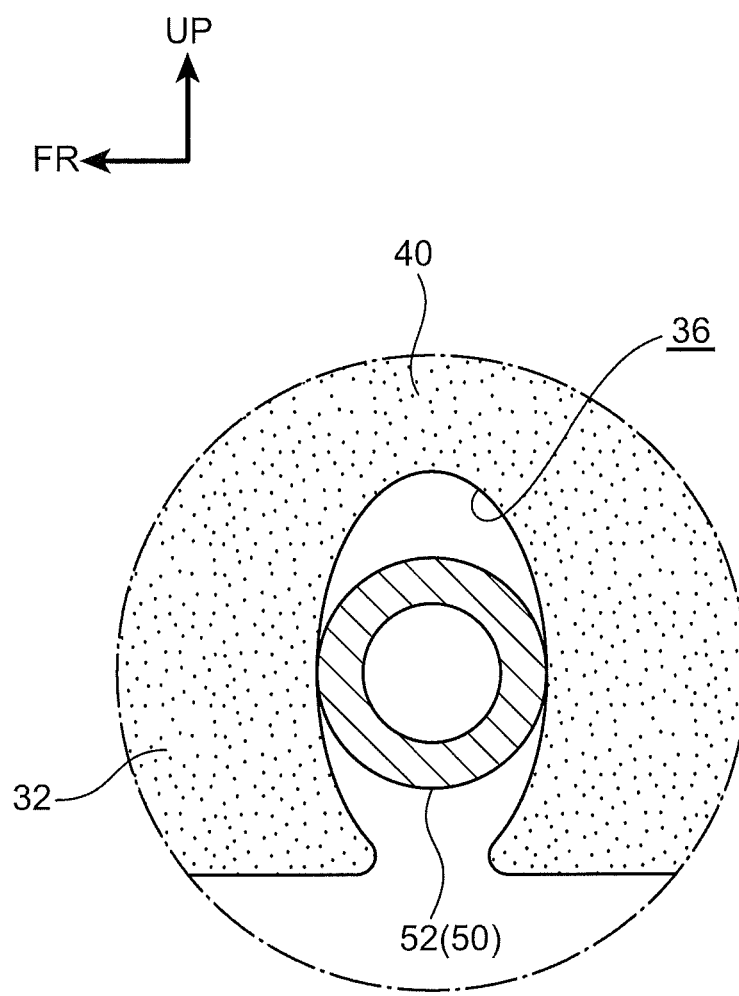
FIG. 6 is an enlarged side cross-section view illustrating a modified example of a groove portion illustrated in FIG. 3.

Although in the second exemplary embodiment, an inner circumferential face of the groove portion 36 is configured by the circular shaped circular arc portion 36A partially open toward the lower side, the shape of the inner circumferential face of the groove portion 36 is not limited thereto. As illustrated in FIG. 6, for example, the inner circumferential face of the groove portion 36 may be formed in a substantially elliptical shape with its major axis in the up-down direction. Gaps are accordingly formed inside the groove portion 36 at the upper side and lower side of the pressure tube 52, thereby enabling the pressure tube 52 being deformed by the groove portion 36 into a substantially flattened shape to be accommodated by the gaps. This enables the pressure tube 52 to be deformed in a desirable manner In the second exemplary embodiment, the absorber 64 is configured by the upper absorber 30, the coupling section 62, and the lower absorber 60. However, the coupling section 62 may be omitted from the absorber 64. Namely, configuration may be applied in which the upper absorber 30 and the lower absorber 60 are separated from each other.

Although in the second exemplary embodiment, the projecting portion 42 of the absorber upper end portion 40 is fixed to the upper face 20U of the bumper reinforcement 20 by the clip 70, the fixing method of the projecting portion 42 of the absorber upper end portion 40 is not limited thereto. Configuration may be applied, for example, in which a portion of the bumper grille fixed to the bumper cover 12 is extended toward the rear side, and the projecting portion 42 is held down from the upper side by the extended portion.

In the first exemplary embodiment to the third exemplary embodiment, the projecting portion 42 extends contiguously along the vehicle width direction. Configuration may instead be applied in which projecting portions 42 are formed intermittently along the vehicle width direction. In such cases, a sheet or the like, extending contiguously along the vehicle width direction, may be interposed between the projecting portions 42 and the upper face 20U of the bumper reinforcement 20 (the upper face 80U of the bracket 80 in the third exemplary embodiment). This enables the weight of the upper absorber 30 to be reduced, while preventing or suppressing entry of foreign objects or the like to the pressure tube 52 side using the sheet.

Although in the first exemplary embodiment and the third exemplary embodiment, the projecting portion 42 of the absorber upper end portion 40 abuts the upper face 20U of the bumper reinforcement 20, configuration may be applied in which a slight gap is formed between the projecting portion 42 and the upper face 20U of the bumper reinforcement 20.

Furthermore, in the first exemplary embodiment to the third exemplary embodiment, examples are described in which the vehicle bumper structure S1 to S3 including the pedestrian collision detection sensor 50 is applied to the front bumper 10. However, technology disclosed herein is not limited thereto, and for example, the front and rear of the above configurations may be inverted, and the vehicle bumper structure S1 to S3 including the pedestrian collision detection sensor 50 may be applied to a rear bumper.

All publications, patent applications and technical standards mentioned in the present specification are incorporated by reference in the present specification to the same extent as if the individual publication, patent application, or technical standard was specifically and individually indicated to be incorporated by reference.

What is claimed is:

1. A vehicle bumper structure including a pressure tube-type pedestrian collision detection sensor, the vehicle bumper structure comprising:

a bumper reinforcement having a length direction that is disposed along a vehicle width direction at an end section in a vehicle front-rear direction;

a pressure tube-type pedestrian collision detection sensor that is configured including a pressure tube that extends along the vehicle width direction at a vehicle front-rear direction outer side of the bumper reinforcement, and that outputs a signal according to a change in pressure of the pressure tube; and an upper absorber that is fixed to the bumper reinforcement, wherein the upper absorber includes:

an absorber main body that is disposed at the vehicle front-rear direction outer side of the bumper reinforcement and fixed, either directly or via another member, to a vehicle front-rear direction outer face on an upper portion of the bumper reinforcement, an absorber upper end portion that is integrally provided with a vehicle upper side of the absorber main body, and includes a projecting portion that projects toward a vehicle front-rear direction inner side with respect to the absorber main body at the vehicle upper side of the bumper reinforcement or the other member fixing the absorber main body, and a groove portion that is formed at a vehicle front-rear direction inner side portion of the absorber main body, that is disposed adjacent to the vehicle lower side of the absorber upper end portion, that is open toward the vehicle front-rear direction inner side or the vehicle lower side, and that retains the pressure tube, and the groove portion is positioned relative to the bumper reinforcement or the other member such that only a vehicle lower side portion of the groove portion is supported from the vehicle front-rear direction inner side by the bumper reinforcement or the other member.

2. The vehicle bumper structure including a pressure tube-type pedestrian collision detection sensor of claim 1, wherein:

the groove portion is open toward the vehicle front-rear direction inner side; and the projecting portion abuts an upper face of the bumper reinforcement or the other member that fixes the absorber main body, so as to be capable of relative movement in the vehicle front-rear direction.

3. The vehicle bumper structure including a pressure tube-type pedestrian collision detection sensor of claim 2, wherein:

the upper face of the bumper reinforcement or the other member is a flat surface.

4. The vehicle bumper structure including a pressure tube-type pedestrian collision detection sensor of claim 2, wherein:

an up-down dimension of a vehicle front-rear direction inside end portion of the absorber main body is set smaller than an up-down dimension of a vehicle front-rear direction outside end portion of the absorber main body.

5. The vehicle bumper structure including a pressure tube-type pedestrian collision detection sensor of claim 4, wherein:

the up-down dimension of the vehicle front-rear direction inside end portion is set smaller than the up-down dimension of the vehicle front-rear direction outside end portion by forming a step portion with a substantially L-shaped cross-section that is open toward the vehicle front-rear direction inner side or a vehicle lower side at a lower end portion of the vehicle front-rear direction inside end portion.

6. A vehicle bumper structure including a pressure tube-type pedestrian collision detection sensor, the vehicle bumper structure comprising:
   a bumper reinforcement having a length direction that is disposed along a vehicle width direction at an end section in a vehicle front-rear direction:
   a pressure tube-type pedestrian collision detection sensor that is configured including a pressure tube that extends along the vehicle width direction at a vehicle front-rear direction outer side of the bumper reinforcement, and that outputs a signal according to a change in pressure of the pressure tube; and
   an upper absorber that is fixed to the bumper reinforcement, wherein the upper absorber includes:
      an absorber main body that is disposed at the vehicle front-rear direction outer side of the bumper reinforcement and fixed, either directly or via another member, to a vehicle front-rear direction outer face on an upper portion of the bumper reinforcement,
      an absorber upper end portion that is integrally provided with a vehicle upper side of the absorber main body, and includes a projecting portion that projects toward a vehicle front-rear direction inner side with respect to the absorber main body at the vehicle upper side of the bumper reinforcement or the other member fixing the absorber main body, and
      a groove portion that is formed at a vehicle front-rear direction inner side portion of the absorber main body, that is disposed adjacent to the vehicle lower side of the absorber upper end portion, that is open toward the vehicle front-rear direction inner side or the vehicle lower side, and that retains the pressure tube, wherein
   the groove portion is open toward the vehicle lower side; and the projecting portion is fixed to an upper face of the bumper reinforcement or the other member that fixes the absorber main body.

7. The vehicle bumper structure including a pressure tube-type pedestrian collision detection sensor of claim 6, wherein
   a lower absorber is provided at a vehicle lower side of the upper absorber, and the lower absorber is disposed adjacent to a vehicle front-rear direction outer face of the bumper reinforcement or the other member that fixes the absorber main body.

8. The vehicle bumper structure including a pressure tube-type pedestrian collision detection sensor of claim 1, wherein:
   the absorber main body is fixed to the bumper reinforcement via the other member; and
   the absorber upper end portion does not project further toward the vehicle upper side than an upper face of the bumper reinforcement.

9. The vehicle bumper structure including a pressure tube-type pedestrian collision detection sensor of claim 1, wherein
   a vehicle front-rear direction outer face of the absorber upper end portion is inclined toward the vehicle front-rear direction inner side on progression toward a vehicle upper side in a side view.

10. The vehicle bumper structure including a pressure tube-type pedestrian collision detection sensor of claim 1, wherein
    the projecting portion extends continuously along the vehicle width direction.

11. The vehicle bumper structure including a pressure tube-type pedestrian collision detection sensor of claim 1, wherein
    the projecting portion forms intermittently along the vehicle width direction.

* * * * *